(12) United States Patent
Mamba et al.

(10) Patent No.: US 12,451,095 B2
(45) Date of Patent: Oct. 21, 2025

(54) DISPLAY DEVICE

(71) Applicant: Magnolia White Corporation, Tokyo (JP)

(72) Inventors: Norio Mamba, Tokyo (JP); Kazunari Tomizawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/887,551

(22) Filed: Sep. 17, 2024

(65) Prior Publication Data
US 2025/0104664 A1    Mar. 27, 2025

(51) Int. Cl.
*G09G 3/36* (2006.01)
*G09G 3/3266* (2016.01)

(52) U.S. Cl.
CPC ... *G09G 3/3677* (2013.01); *G09G 2300/0426* (2013.01); *G09G 2310/0286* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 8,502,810 B2* | 8/2013 | Yoshinaga | ........... | H04N 13/398 345/211 |
| 10,886,904 B1* | 1/2021 | Zhou | .............. | H03K 19/018557 |
| 2007/0120794 A1* | 5/2007 | Shin | ...................... | G09G 3/3648 345/89 |
| 2010/0295837 A1 | 11/2010 | Yoshinaga et al. | | |
| 2011/0128269 A1* | 6/2011 | Lee | .......... | G02B 30/25 345/211 |
| 2014/0225819 A1* | 8/2014 | Onuma | ................. | G09G 3/3648 345/87 |
| 2015/0255015 A1* | 9/2015 | Takahara | .............. | G09G 3/3225 345/76 |
| 2017/0178581 A1* | 6/2017 | Li | .......... | G11C 19/28 |
| 2019/0005884 A1* | 1/2019 | Yoo | ........... | G09G 3/3266 |
| 2019/0066560 A1* | 2/2019 | Mi | ........... | G11C 19/28 |
| 2019/0114955 A1* | 4/2019 | Yamamoto | ........... | G09G 3/2085 |
| 2022/0415232 A1* | 12/2022 | Zhang | .................... | G11C 19/28 |
| 2024/0221587 A1* | 7/2024 | Shen | ...................... | G09G 3/3677 |
| 2024/0233652 A1* | 7/2024 | Yang | ...................... | G09G 3/3233 |

FOREIGN PATENT DOCUMENTS

JP    2010-271366 A    12/2010

* cited by examiner

*Primary Examiner* — Sepehr Azari
(74) *Attorney, Agent, or Firm* — K&L Gates LLP

(57) ABSTRACT

According to an aspect, a display device includes: a substrate that has a display area; pixels that are provided in the display area and are arranged in a first direction and a second direction intersecting the first direction; gate lines that extend in the first direction and are arranged in the second direction; and a first gate driver and a second gate driver that are configured to supply gate drive signals to the gate lines. The first and second gate drivers are each provided along the second direction and are arranged in the first direction. The first and second gate drivers are configured to: sequentially scan the gate lines in a first area of the display area; and simultaneously scan more than one of the gate lines that are adjacent to one another in the second direction in a second area different from the first area of the display area.

9 Claims, 10 Drawing Sheets

DISPLAY DEVICE

CROSS-REFERENCE TO RELATED APPLICATION

This application claims the benefit of priority from Japanese Patent Application No. 2023-166118 filed on Sep. 27, 2023, the entire contents of which are incorporated herein by reference.

BACKGROUND

1. Technical Field

What is disclosed herein relates to a display device.

2. Description of the Related Art

Japanese Patent Application Laid-open Publication No. 2010-271366 (JP-A-2010-271366) describes a display device that can simultaneously drive a set of a plurality of adjacent gate lines (scan lines).

Such display devices are required to reduce the decrease in the frame rate while increasing the definition of display. According to JP-A-2010-271366, it may be difficult to achieve both a higher definition of display and a higher frame rate.

SUMMARY

According to an aspect, a display device includes: a substrate that has a display area; a plurality of pixels that are provided in the display area and are arranged in a first direction and a second direction intersecting the first direction; a plurality of gate lines that extend in the first direction and are arranged in the second direction; and a first gate driver and a second gate driver that are configured to supply gate drive signals to the gate lines. The first gate driver and the second gate driver are each provided along the second direction and are arranged in the first direction. The first gate driver and the second gate driver are configured to: sequentially scan the gate lines in a first area of the display area; and simultaneously scan more than one of the gate lines that are adjacent to one another in the second direction in a second area different from the first area of the display area.

DETAILED DESCRIPTION

Figure 1:
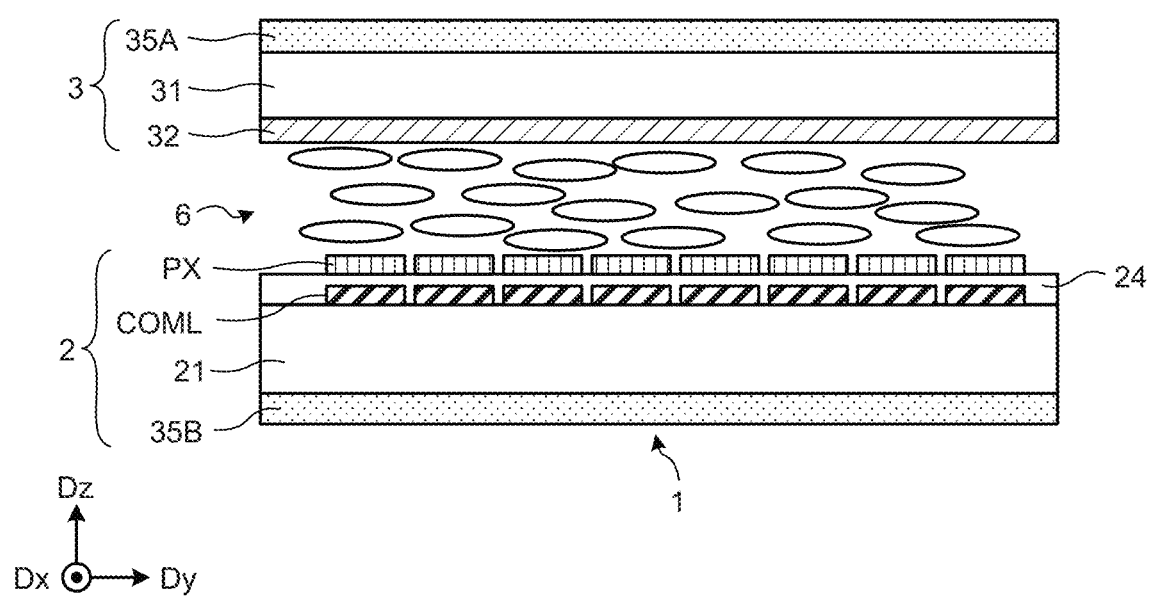
FIG. 1 is a sectional view schematically illustrating a display device according to an embodiment.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same element as that illustrated in a drawing that has already been discussed is denoted by the same reference numeral through the present disclosure and the drawings, and detailed description thereof will not be repeated in some cases where appropriate.

Embodiment

FIG. 1 is a sectional view schematically illustrating a display device according to an embodiment. A display device 1 according to the present embodiment is, for example, a liquid crystal display device using liquid crystal display elements as display elements. In the present embodiment, the display device 1 can employ, for example, a column inversion driving method or a frame inversion driving method as a driving method. The driving method in the display device 1 is not limited to the column inversion driving method or the frame inversion driving method.

As illustrated in FIG. 1, the display device 1 includes an array substrate 2, a counter substrate 3, and a liquid crystal layer 6. The array substrate 2 includes a first substrate 21 made of glass or transparent resin, a plurality of pixel electrodes PX, a common electrode COML, and an insulating layer 24 that insulates the pixel electrodes PX from the common electrode COML. The pixel electrodes PX are arranged, for example, in a matrix having a row-column configuration above the first substrate 21. The common electrode COML is provided between the first substrate 21 and the pixel electrodes PX. The number of the common electrodes COML is not limited to one and may be more than one.

The pixel electrodes PX and the common electrode COML are made of a light-transmitting conductive material such as indium tin oxide (ITO). A polarizing plate 35B is provided on the underside of the first substrate 21 with an adhesive layer (not illustrated) interposed therebetween.

Figure 2:
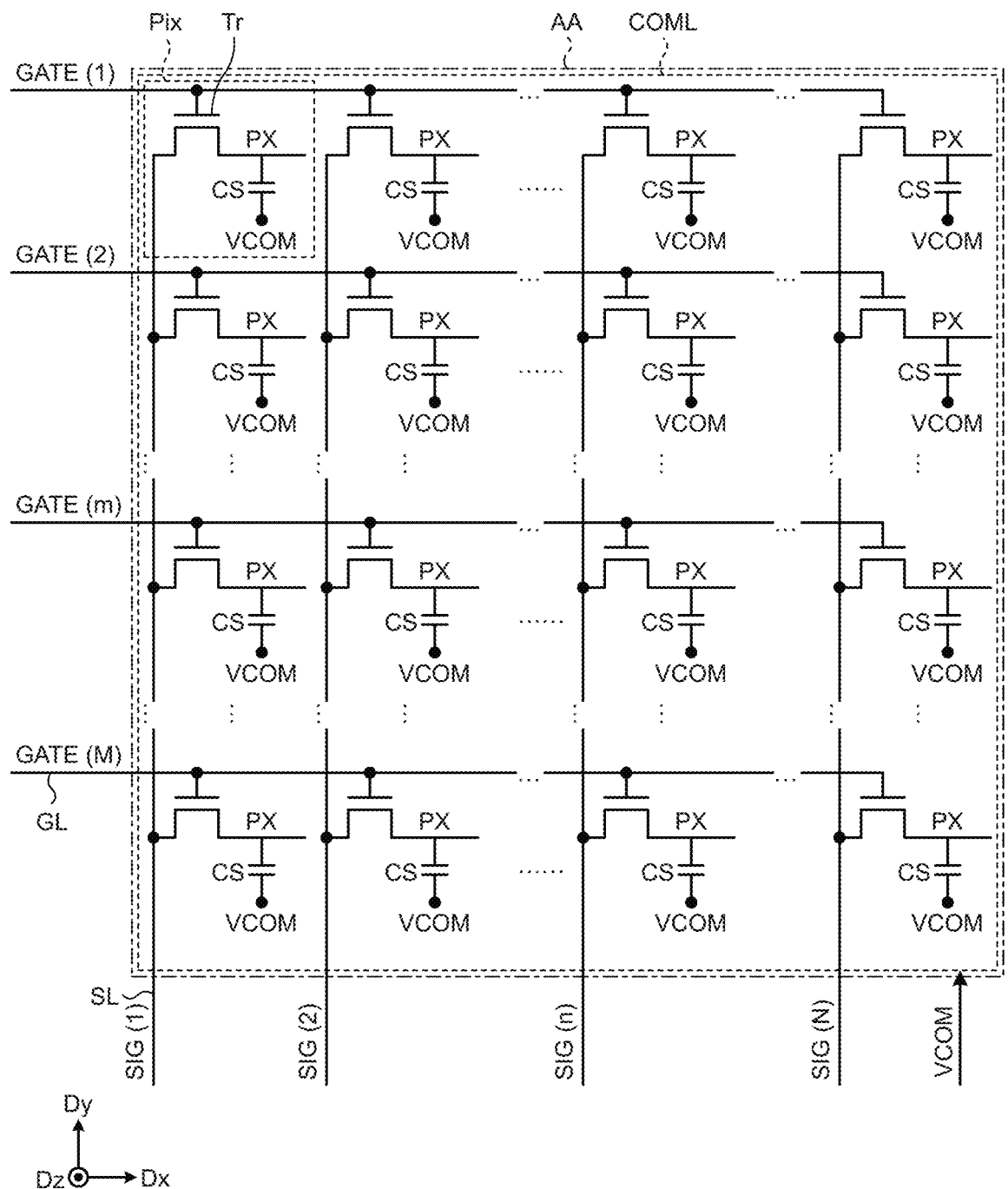
FIG. 2 is a diagram illustrating an exemplary pixel array of the display device according to the embodiment.

The array substrate 2 is provided with a pixel transistor Tr in each pixel Pix (refer to FIG. 2) and wiring including signal lines SL (refer to FIG. 2) and gate lines GL (refer to FIG. 2). The signal lines SL supply pixel signals SIG to the pixel electrodes PX, and the gate lines GL supplies gate drive signals GATE to drive pixel transistors Tr. The signal lines SL and the gate lines GL extend in a plane parallel to a surface of the first substrate 21.

The counter substrate 3 includes a second substrate 31 made of glass or transparent resin, and a color filter 32 and a light-blocking layer (not illustrated) formed on one surface of the second substrate 31. A polarizing plate 35A is provided on the upper side of the second substrate 31 with an adhesive layer (not illustrated) interposed therebetween.

The array substrate 2 and the counter substrate 3 are arrange so as to face each other with a predetermined gap (cell gap) provided therebetween. The liquid crystal layer 6 is provided as a display function layer in a space between the first substrate 21 and the second substrate 31. The liquid crystal layer 6 modulates light passing through the liquid crystal layer 6 by changing the orientation state of liquid crystal molecules for each pixel Pix according to the state of an electric field between each of the pixel electrodes PX and the common electrode COML. In the present embodiment, liquid crystals suitable for a horizontal electric field mode such as an in-plane switching (IPS) mode including a fringe field switching (FFS) mode are used.

The display device 1 includes a light source device (backlight), which is not illustrated, that illuminates a display area AA from behind. The backlight is disposed so as to face the array substrate 2, and the counter substrate 3 is located on the display surface side. The backlight includes, for example, a plurality of light-emitting diodes (LEDs) as light-emitting elements. Various forms of the backlight are applicable, but detailed structures thereof will not be described.

FIG. 2 is a diagram illustrating an exemplary pixel array of the display device according to the embodiment. As illustrated in FIG. 2, the display device 1 includes the pixels Pix, the gate lines GL, and the signal lines SL that are provided on the array substrate 2. The pixels Pix are arranged in a matrix having a row-column configuration in the display area AA of the array substrate 2. That is, the pixels Pix are arranged in a first direction Dx and in a second direction Dy intersecting the first direction Dx.

In the following description, the first direction Dx is one direction in a plane parallel to the array substrate 2. The second direction Dy is one direction in the plane parallel to the array substrate 2 and orthogonal to the first direction Dx. The second direction Dy may non-orthogonally intersect the first direction Dx. The third direction Dz is a direction orthogonal to the first direction Dx and the second direction Dy and is a direction normal to a principal surface of the array substrate 2. The term "plan view" refers to a positional relation as viewed in a direction perpendicular to the array substrate 2.

The gate lines GL each extend in the first direction Dx and are arranged in the second direction Dy. The gate lines GL are each coupled to the pixels Pix arranged in the first direction Dx. The gate lines GL supply the gate drive signals GATE to the pixels Pix.

The signal lines SL each extend in the second direction Dy and are arranged in the first direction Dx. The signal lines SL are each coupled to the pixels Pix arranged in the second direction Dy. The signal lines SL supply the pixel signals SIG to the pixels Pix.

Each of the pixels Pix includes the pixel transistor Tr and the pixel electrode PX. The pixel transistor Tr is configured as a thin-film transistor (TFT), such as an n-channel metal oxide semiconductor (MOS) thin-film transistor (TFT) (hereinafter, also called "n-type TFT"). The source of the pixel transistor Tr is coupled to the signal line SL; the gate thereof is coupled to the gate line GL; and the drain thereof is coupled to the pixel electrode PX. Holding capacitance CS is generated between the pixel electrode PX and the common electrode COML.

The gates of the pixel transistors Tr of the pixels Pix arranged in the first direction Dx are each supplied with the gate drive signal GATE through the gate line GL. The sources of the pixel transistors Tr of the pixels Pix arranged in the second direction Dy are each supplied with the pixel signal SIG through the signal line SL. FIG. 2 illustrates the example in which N of the pixels Pix are arranged in the first direction Dx and M of the pixels Pix are arranged in the second direction Dy, but the present disclosure is not limited to this example. Hereafter, a row in which the pixels Pix are arranged in the first direction Dx is also referred to as "pixel row". A column in which the pixels Pix are arranged in the second direction Dy is also referred to as "pixel column".

The pixel Pix includes, for example, a red pixel to display red (R), a green pixel to display green (G), and a blue pixel to display blue (B). For example, a stripe array in which the red, green, and blue (RGB) pixels are arranged in the first direction Dx is exemplified as the pixel array. However, the pixel array is not limited to the stripe array of RGB. Specifically, for example, white pixels to display white (W) may be arranged as the pixels Pix, or the array may be a diagonal stripe array having a predetermined angle with respect to the first direction Dx or the second direction Dy, or the array may be such that a plurality of pixel groups that display different colors are periodically arranged in both the first direction Dx and second direction Dy.

Figure 3:
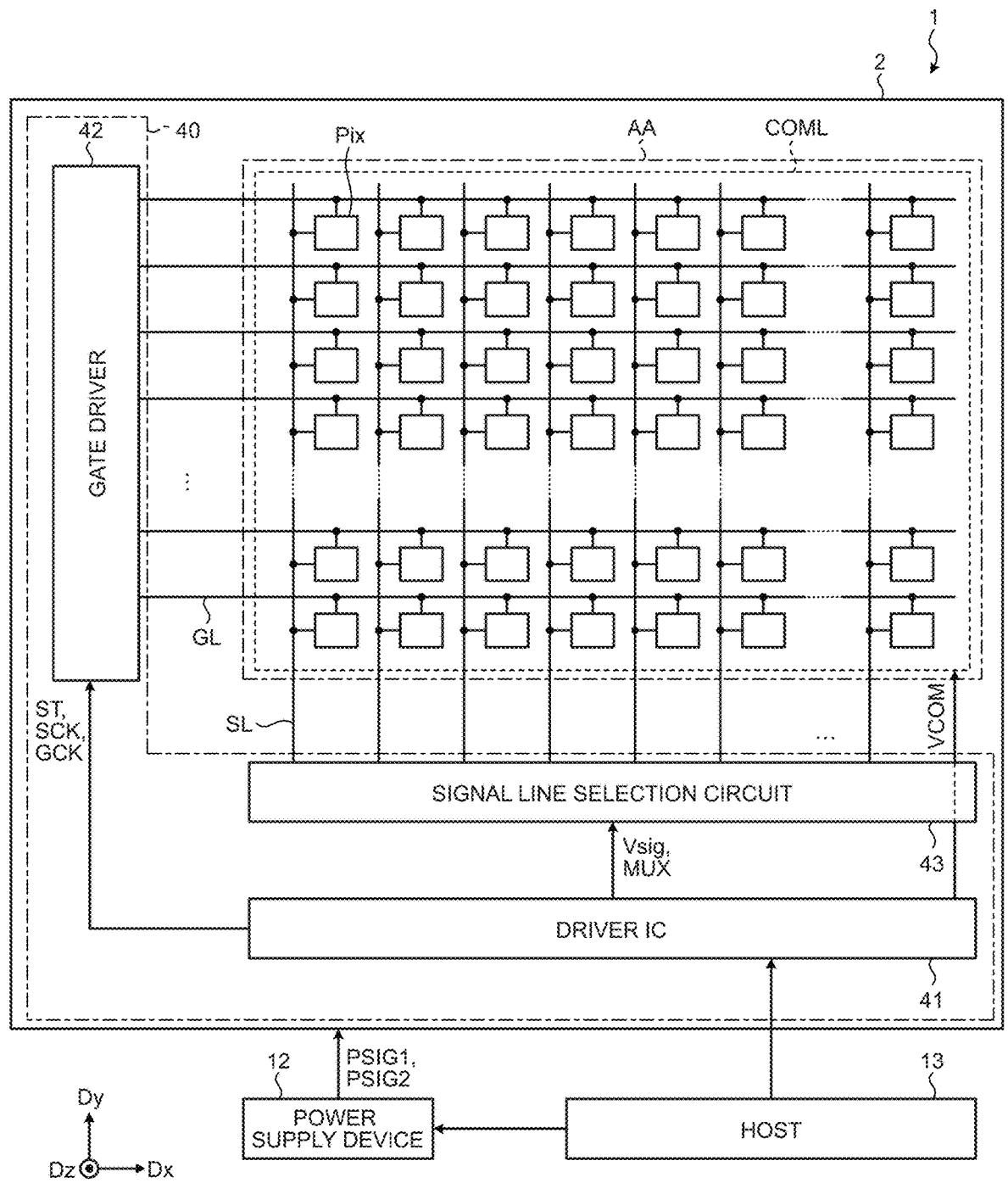
FIG. 3 is a diagram illustrating a configuration example of the display device according to the embodiment.

FIG. 3 is a diagram illustrating a configuration example of the display device according to the embodiment. As illustrated in FIG. 3, the display device 1 further includes a drive circuit 40, a power supply device 12, and a host 13 (control device).

The host 13 transmits video signals that are original signals of video images to be displayed in the display area AA, to a driver integrated circuit (IC) 41. The host 13 also transmits control signals to control the drive circuit 40 to the display device 1. The host 13 also transmits control signals to control the supply of power from the power supply device 12 to the drive circuit 40, to the power supply device 12.

The host 13 includes, for example, a central processing unit (CPU) and storage devices such as a memory. The host 13 executes computer programs using these hardware resources such as the CPU and the storage devices to cause the display device 1 perform display functions. The host 13 controls the images to be displayed on the display device 1 according to the results of the execution of the computer programs so that the driver IC 41 can handle the images as information on image input gradations.

The power supply device 12 supplies power to the drive circuit 40 provided on the array substrate 2 based on the control signals from the host 13. Specifically, the power supply device 12 generates a first power supply voltage signal PSIG1 having a positive value and a second power supply voltage signal PSIG2 having a negative value, which are supplied to the drive circuit 40. The first power supply voltage signal PSIG1 is controlled to have a first potential (VGH). The second power supply voltage signal PSIG2 is controlled to have a second potential (VGL) lower than the first potential (VGH). The power supply device 12 also supplies power to the driver IC 41 included in the drive circuit 40.

The drive circuit 40 is provided in a peripheral area surrounding the display area AA. The drive circuit 40 includes the driver IC 41 (display control circuit), a gate driver 42, and a signal line selection circuit 43. The driver IC 41 is mounted in the peripheral area surrounding the display area AA. The driver IC 41 is coupled to the host 13 via a relay board made of a flexible printed circuit (FPC) board, for example. The gate driver 42 and the signal line selection circuit 43 are thin-film transistor (TFT) circuits formed in the peripheral area surrounding the display area AA.

The driver IC 41 controls the gate driver 42 and the signal line selection circuit 43. Specifically, the driver IC 41 supplies control signals such as a start signal ST, a shift clock signal SCK, and an output control signal GCK to the gate driver 42. The driver IC 41 also supplies a selection control signal MUX to the signal line selection circuit 43. The driver IC 41 converts the video signals from the host 13 into image signals Vsig and outputs them. The image signals Vsig are, for example, signals obtained by time-division multiplexing the pixel signals SIG corresponding to the RGB pixel array. The driver IC 41 also supplies a common potential VCOM to the common electrode COML.

The gate driver 42 is a circuit that generates the gate drive signal GATE based on the start signal ST, the shift clock signal SCK, and the output control signal GCK output from the driver IC 41.

The signal line selection circuit 43 supplies the pixel signals SIG to the pixels Pix included in a pixel row selected by the gate driver 42. The signal line selection circuit 43 includes a switch circuit that selects the signal line SL to supply the pixel signal SIG. The signal line selection circuit 43 selectively outputs the pixel signals SIG corresponding to the pixels Pix based on the image signals Vsig from the driver IC 41.

Figure 4:
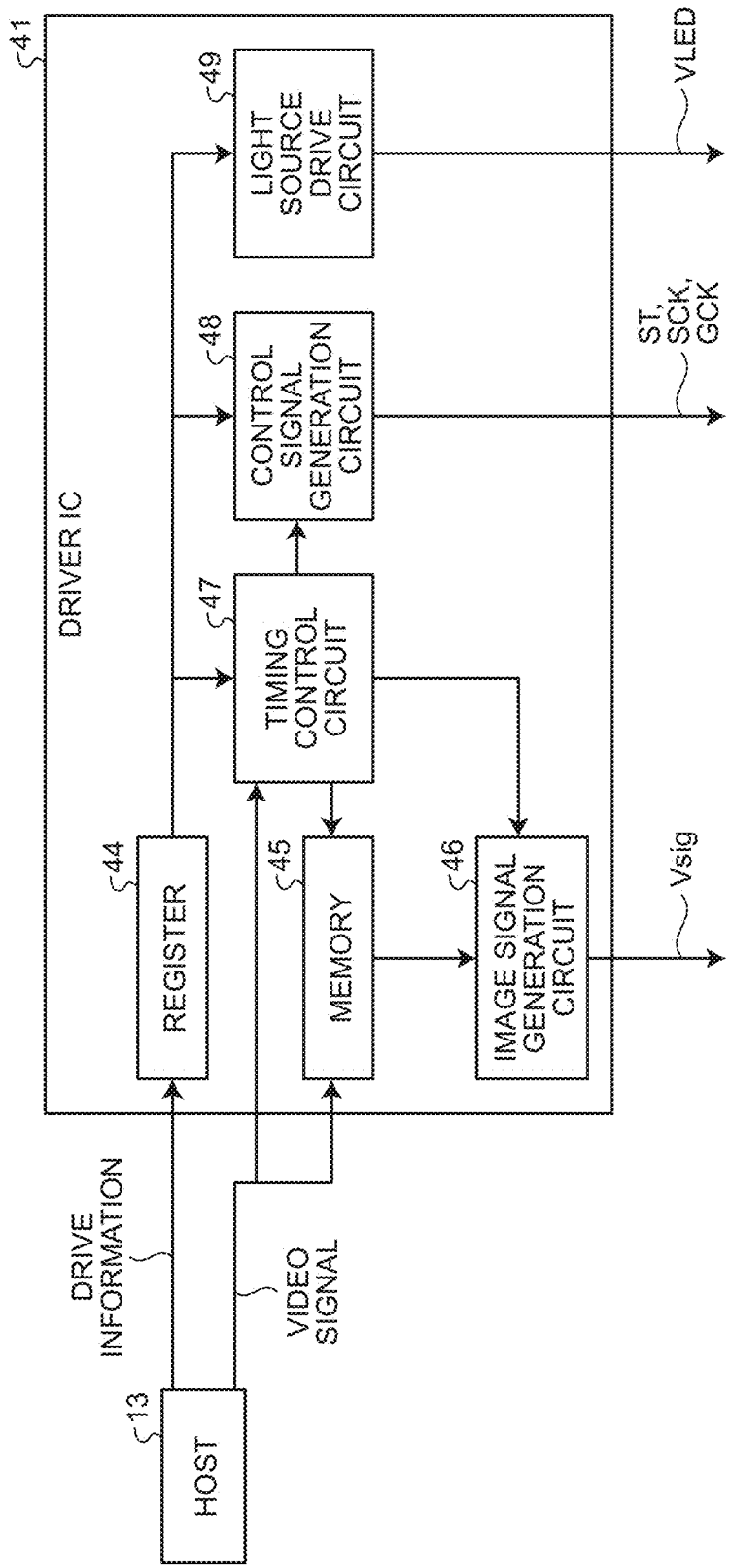
FIG. 4 is a block diagram illustrating a configuration example of a host and a driver integrated circuit (IC) according to the embodiment.

FIG. 4 is a block diagram illustrating a configuration example of the host and the driver IC according to the embodiment. In the display device 1 according to the embodiment, the driver IC 41 controls the gate driver 42, the signal line selection circuit 43, and the backlight (not illustrated) based on the control signals and various types of information from the host 13 (control device).

As illustrated in FIG. 4, the driver IC 41 includes a register 44, a memory 45, an image signal generation circuit 46, a timing control circuit 47, a control signal generation circuit 48, and a light source drive circuit 49.

The timing control circuit 47 controls the memory 45, the image signal generation circuit 46, the control signal generation circuit 48, and the light source drive circuit 49 such that they operate synchronously, based on the control signals and the various types of information from the host 13.

The register 44 is a circuit that receives and temporarily stores drive information from the host 13. The drive information includes information, for example, on the number of bundled gate lines GN (refer to FIG. 5) when the gate driver 42 scans the gate lines GL and on divided areas (first area AA1, second area AA2, and third area AA3) of the display area AA (refer to FIG. 5).

The memory 45 is a circuit that receives and temporarily stores the video signals from the host 13. The image signal generation circuit 46 generates the image signals Vsig based on the video signals acquired from the memory 45. The image signal generation circuit 46 outputs the generated image signals Vsig to the signal line selection circuit 43 (refer to FIG. 3).

The control signal generation circuit 48 is a circuit that generates the control signals such as the start signal ST, the shift clock signal SCK, and the output control signal GCK based on the drive information from the host 13. The control signal generation circuit 48 supplies the control signals such as the start signal ST, the shift clock signal SCK, and the output control signal GCK to the gate driver 42. This operation causes the gate driver 42 to scan the gate lines GL sequentially or simultaneously according to the drive information. The control signal generation circuit 48 generates and outputs the selection control signal MUX (refer to FIG. 3) to the signal line selection circuit 43 (refer to FIG. 3).

The light source drive circuit 49 is a circuit that outputs a drive signal VLED to the light-emitting elements included in the backlight (not illustrated) based on the drive information from the host 13. Various forms of driving of the backlight are applicable depending on, for example, the configuration of the pixels Pix in the display area AA, but will not be described in detail.

In the display device 1 of the present embodiment, the gate driver 42 sequentially or simultaneously scans the gate lines GL for each area during a period in which one frame image is displayed (one frame period). That is, the gate driver 42 scans the gate lines GL while changing the number of the bundled gate lines GL for each area. The following describes a detailed configuration of the gate driver 42 and a method for scanning the gate lines GL with reference to FIGS. 5 to 10.

Figure 5:
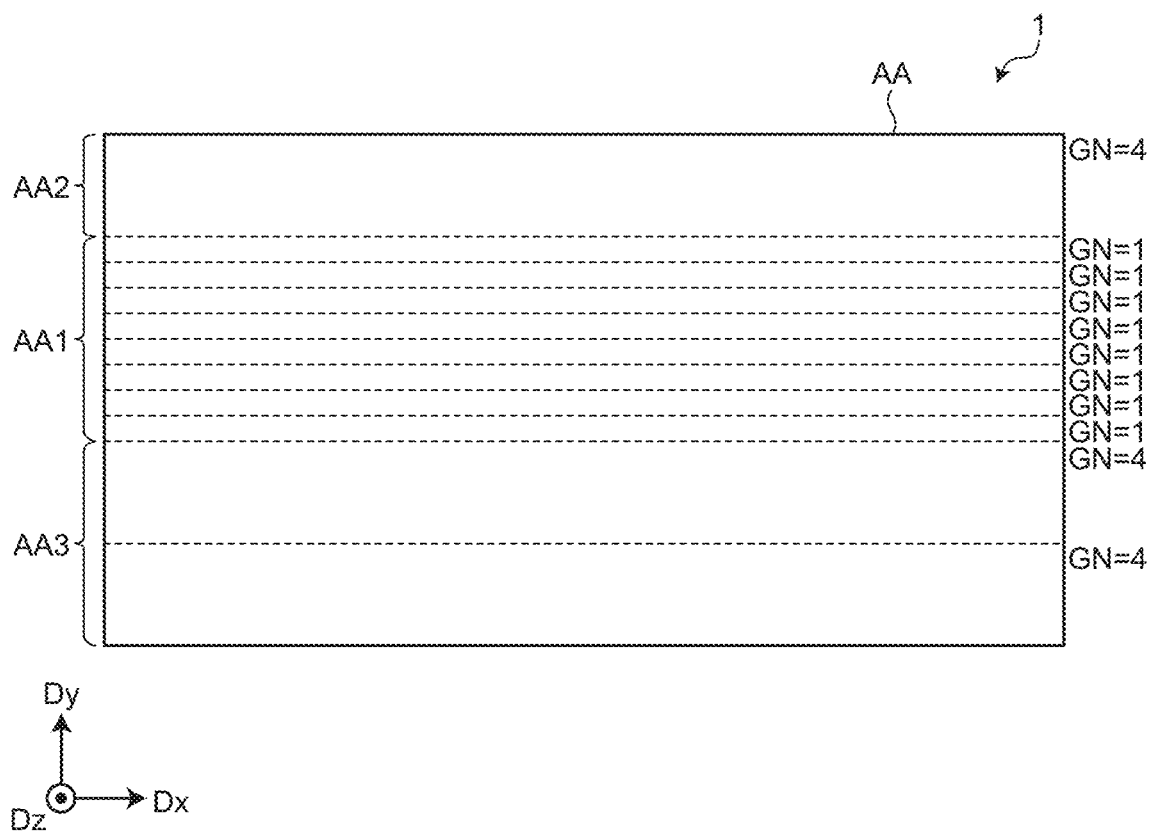
FIG. 5 is an explanatory diagram schematically illustrating a method for scanning a plurality of gate lines of the display device according to the embodiment.

FIG. 5 is an explanatory diagram schematically illustrating the method for scanning the gate lines of the display device according to the embodiment. As illustrated in FIG. 5, the display area AA includes the first area AA1, the second area AA2, and the third area AA3. The first area AA1, the second area AA2, and the third area AA3 are areas each provided correspondingly to a plurality of pixel rows.

The first area AA1 is located in a central portion of the display area AA in the second direction Dy. The second area AA2 is located adjacent to the first area AA1 on one side thereof in the second direction Dy (upper side in FIG. 5). The third area AA3 is located adjacent to the first area AA1 on the other side thereof in the second direction Dy (lower side in FIG. 5). In other words, the first area AA1 is located between the second area AA2 and the third area AA3 in the second direction Dy.

The gate driver 42 sequentially scans the gate lines GL in the first area AA1 (the number of bundled gate lines GN=1). In other words, the gate driver 42 sequentially supplies the gate drive signal GATE to each of the gate lines GL in the first area AA1 on a one-by-one basis.

The gate driver 42 simultaneously scans more than one of the gate lines GL arranged in the second direction Dy in each of the second and the third areas AA2 and AA3 (the number of bundled gate lines GN=4, for example). In other words, the gate driver 42 simultaneously supplies the gate drive signals GATE to the more than one of the gate lines GL (for example, four gate lines GL) in each of the second and the third areas AA2 and AA3.

This method allows the display device 1 to perform the display in the first area AA1 located in the central portion of the display area AA at a higher definition than in the second and the third areas AA2 and AA3. In contrast, the display device 1 can shorten the period required for scanning the gate lines GL (hereinafter, expressed as "drive period") in each of the second and the third areas AA2 and AA3 located at end portions of the display area AA to quarter the time required when the gate drive signal GATE is sequentially supplied. Therefore, the display device 1 can reduce the decrease in the frame rate while increasing the definition of the display. The frame rate represents the number of frame images displayed in a predetermined time (for example, one second).

Figure 6:
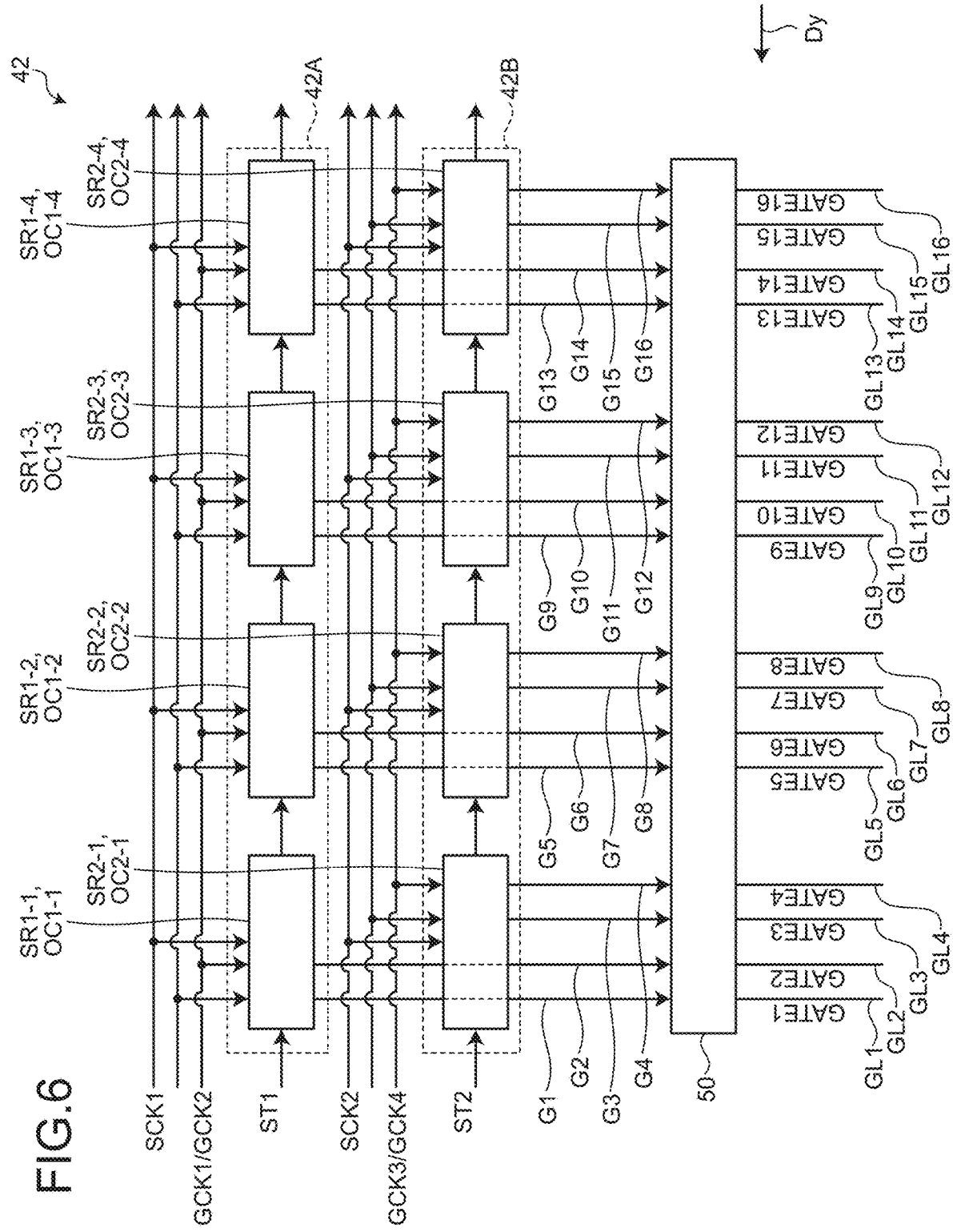
FIG. 6 is a block diagram schematically illustrating a gate driver.

FIG. 6 is a block diagram schematically illustrating the gate driver. As illustrated in FIG. 6, the gate driver 42 includes a first gate driver 42A and a second gate driver 42B. The gate driver 42 further includes a buffer circuit 50. The first and the second gate drivers 42A and 42B are coupled to ends of the gate lines GL on the same side. The first and the second gate drivers 42A and 42B are each provided along the second direction Dy and are arranged in the extending direction of the gate lines GL (first direction Dx).

The first and the second gate drivers 42A and 42B receive different start signals ST1 and ST2 (input signals), different shift clock signals SCK1 and SCK2, and different output control signals GCK1/GCK2 and GCK3/GCK4, respectively, and are controlled independently of each other. The first and the second gate drivers 42A and 42B output gate control signals G (G1, G2, . . . ) that are logic values of the gate drive signals GATE, based on various control signals.

The buffer circuit 50 is a circuit that receives the gate control signals G (G1, G2, . . . ) generated as the logic values and generates the gate drive signals GATE each having the first potential VGH or the second potential VGL. The buffer circuit 50 supplies the gate drive signals GATE to the gate lines GL corresponding to the gate control signals G.

In more detail, the first gate driver 42A includes a plurality of first register circuits SR1-1, SR1-2, SR1-3, SR1-4, . . . arranged in the second direction Dy, and a plurality of first output circuits OC1-1, OC1-2, OC1-3, OC1-4, . . . provided correspondingly to the first register circuits SR1-1, SR1-2, SR1-3, SR1-4, . . . , respectively.

The second gate driver 42B is arranged parallel to the first gate driver 42A. The second gate driver 42B includes a plurality of second register circuits SR2-1, SR2-2, SR2-3, SR2-4, . . . arranged in the second direction Dy, and a plurality of second output circuits OC2-1, OC2-2, OC2-3, OC2-4, . . . provided correspondingly to the second register circuits SR2-1, SR2-2, SR2-3, SR2-4, . . . , respectively.

In the following description, the first register circuits SR1-1, SR1-2, SR1-3, SR1-4, . . . will each be simply referred to as "first register circuit SR1" when they need not be distinguished from one another. The first output circuits OC1-1, OC1-2, OC1-3, OC1-4, will each be simply referred to as "first output circuit OC1" when they need not be distinguished from one another.

The second register circuits SR2-1, SR2-2, SR2-3, SR2-4, . . . will each be simply referred to as "second register circuit SR2" when they need not be distinguished from one another. The second output circuits OC2-1, OC2-2, OC2-3, OC2-4, . . . will each be simply referred to as "second output circuit OC2" when they need not be distinguished from one another.

The gate lines GL are coupled alternately to the first and the second gate drivers 42A and 42B in units of P (P is a natural number) of the gate lines GL arranged in the second direction Dy. In the example illustrated in FIG. 6, P=2.

Gate lines GL1 and GL2 are coupled to the first register circuit SR1-1 and the first output circuit OC1-1 of the first gate driver 42A. Gate lines GL3 and GL4 are coupled to the second register circuit SR2-1 and the second output circuit OC2-1 of the second gate driver 42B. Gate lines GL5 and GL6 are coupled to the first register circuit SR1-2 and the first output circuit OC1-2 of the first gate driver 42A. Gate lines GL7 and GL8 are coupled to the second register circuit SR2-2 and the second output circuit OC2-2 of the second gate driver 42B. Subsequent gate lines GL9, GL10, . . . are also alternately coupled to the first and the second gate drivers 42A and 42B in the same way.

A total of four (=P×2) gate lines GL are coupled to one set of the first register circuit SR1 and the first output circuit OC1, and one set of the second register circuit SR2 and the second output circuit OC2 provided correspondingly thereto.

Figure 7:
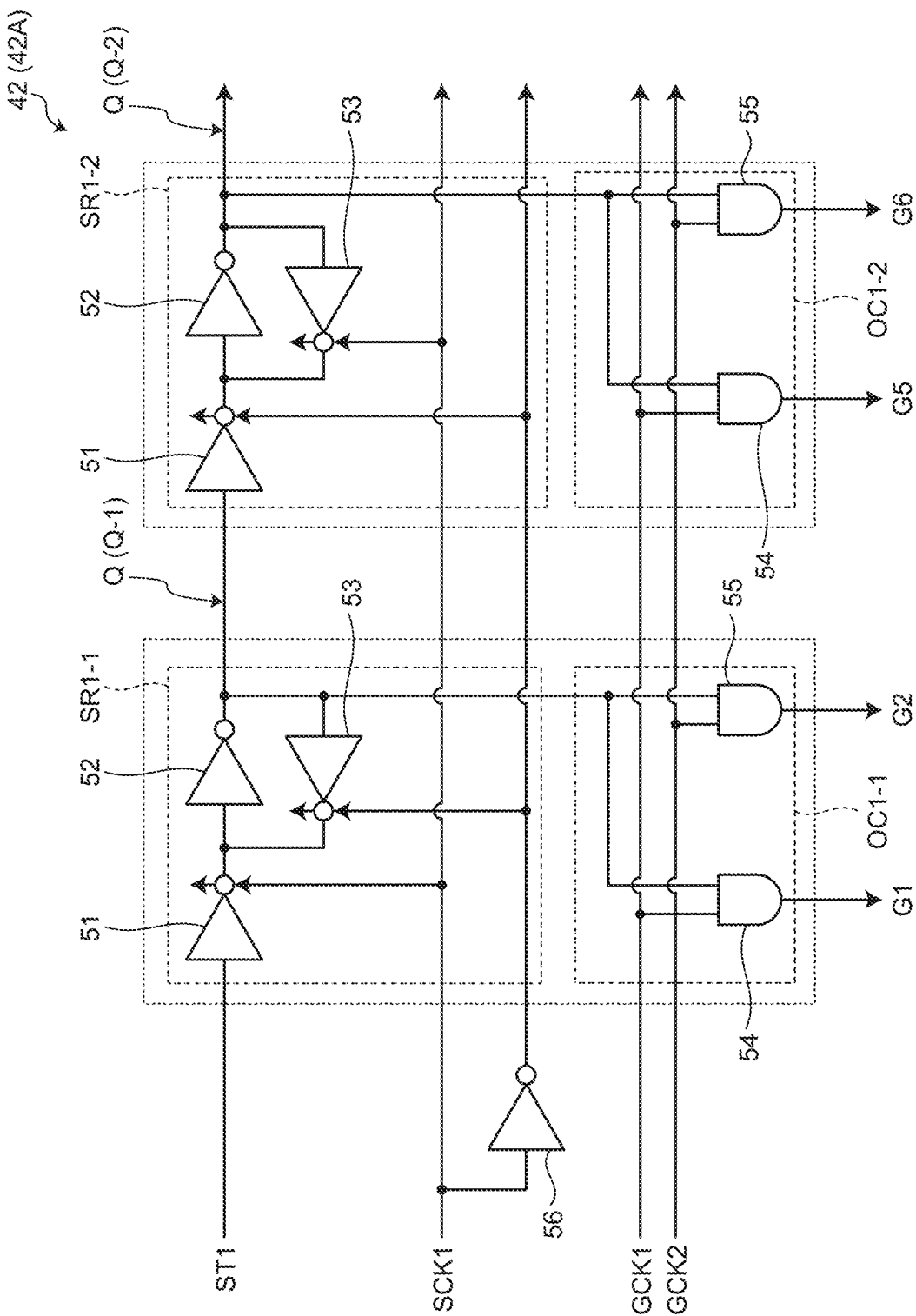
FIG. 7 is a circuit diagram illustrating a configuration example of a first gate driver.

FIG. 7 is a circuit diagram illustrating a configuration example of the first gate driver. The first register circuit SR1 and the first output circuit OC1 of the first gate driver 42A will be described with reference to FIG. 7. The second gate driver 42B has the same configuration as the first gate driver 42A. The description of the first register circuit SR1 and the first output circuit OC1 in FIG. 7 is also applicable to the second register circuit SR2 and the second output circuit OC2.

As illustrated in FIG. 7, the first register circuit SR1 includes clocked inverters 51 and 53 and an inverter 52. When the shift clock signal SCK1 is set to a high potential (hereinafter, denoted as H), the clocked inverter 51 of the first register circuit SR1-1 is turned on and the inverted signal of the start signal ST1 is output to the inverter 52. Since the signal is inverted by the inverter 52, an output signal Q of the first register circuit SR1-1 becomes a high-potential (H) signal, like the start signal ST1 at the high potential (H).

An inverter 56 supplies the inverted signal of the shift clock signal SCK1 to the clocked inverter 53 of the first register circuit SR1-1 and the clocked inverter 51 of the first register circuit SR1-2 at the subsequent stage. Therefore, when the shift clock signal SCK1 is at the high potential (H), the clocked inverter 53 of the first register circuit SR1-1 and the clocked inverter 51 of the first register circuit SR1-2 at the subsequent stage are off. That is, the output signal Q of the first register circuit SR1-1 is not transferred to the first register circuit SR1-2 while the shift clock signal SCK1 maintains the high potential (H).

When the shift clock signal SCK1 is set to a low potential (hereinafter, denoted as L), the clocked inverter 51 of the first register circuit SR1-1 is turned off and the clocked inverter 51 of the first register circuit SR1-2 at the subsequent stage is turned on. As a result, the output signal Q of the first register circuit SR1-1 is transferred to the first register circuit SR1-2. In this case, the clocked inverter 53 of the first register circuit SR1-1 is turned on and the output signal Q is held by the inverter 52 and the clocked inverter 53. As a result, the output signal Q is restrained from changing after the clocked inverter 51 of the first register circuit SR1-1 is turned off until the clocked inverter 51 of the first register circuit SR1-2 at the subsequent stage is turns on.

Thus, the first register circuit SR outputs the output signal Q corresponding to the start signal ST1 (input signal) having the high potential (H) at a time of a rising or a falling edge of the shift clock signal SCK1. At the time of the rising edge or the falling edge of the shift clock signal SCK1, the output signal Q is sequentially transferred to the first register circuit SR at the subsequent stage.

As illustrated in FIG. 7, the first output circuit OC1 includes AND circuits 54 and 55. P AND circuits 54 and 55 (P=2 in the present embodiment) are provided correspondingly to the number of the gate lines GL coupled to one set of the first register circuit SR1 and the first output circuit OC1. The AND circuit 54 generates a logical product value of the output signal Q of the first register circuit SR1 and the output control signal GCK1. The AND circuit 55 generates a logical product value of the output signal Q of the first register circuit SR1 and the output control signal GCK2.

As described above, the second register circuit SR2 and the second output circuit OC2 of the second gate driver 42B have the same configuration as the first register circuit SR and the first output circuit OC1. As illustrated in FIG. 6, the second register circuit SR2 and the second output circuit OC2 operate based on the start signal ST2, the shift clock signal SCK2, and the output control signals GCK3 and GCK4. In other words, the second gate driver 42B (second register circuit SR2 and second output circuit OC2) operates based on the signals different from those for the first gate driver 42A (first register circuit SR and first output circuit OC1).

In the present embodiment, the first and the second gate drivers 42A and 42B may operate synchronously or non-synchronously with each other. Therefore, the first and the second gate drivers 42A and 42B can improve the flexibility of scanning operation of the gate lines GL as compared with a case where only one of the first and the second gate drivers 42A and 42B is provided.

Figure 8:
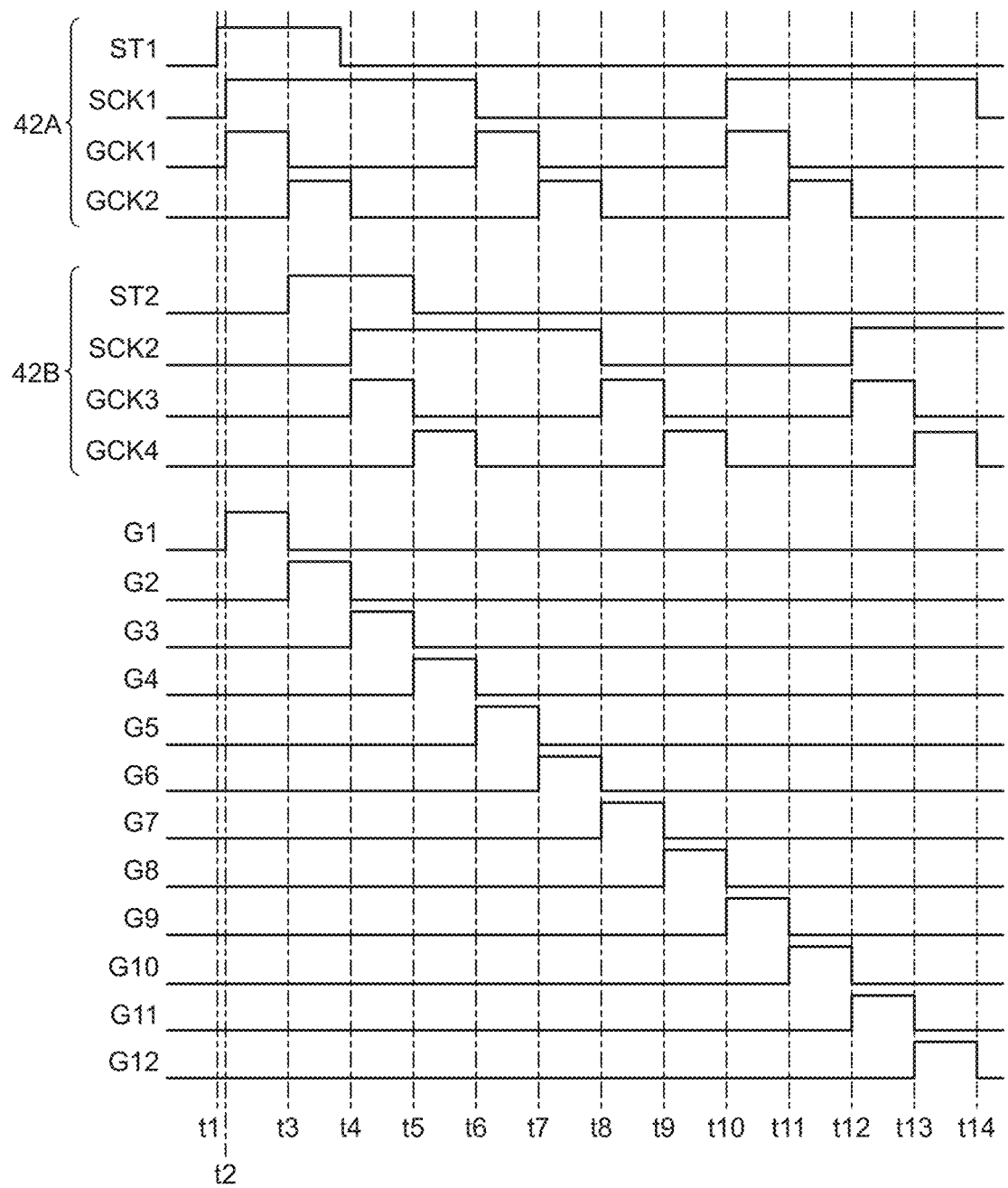
FIG. 8 is a timing diagram for explaining the method for scanning the gate lines in a first area.

FIG. 8 is a timing diagram for explaining the method for scanning the gate lines in the first area. As illustrated in FIG. 8, in the first gate driver 42A, the start signal ST1 is set to the high potential (H) at time t1. The shift clock signal SCK1 changes from the low potential (L) to the high potential (H) at time t2. At time t2, that is, at the time of the rising edge of the shift clock signal SCK1, the output signal Q is output from the first register circuit SR1.

During the period when the shift clock signal SCK1 is at the high potential (H), the output control signals GCK1 and GCK2 are set to the high potential (H) in a time-division manner. In more detail, the output control signal GCK1 is set to the high potential (H) at time t2. The output control signal GCK2 is set to the high potential (H) at time t3. The gate control signals G1 and G2 are set to the high potential (H) in a time-division manner according to the output control signals GCK1 and GCK2.

In the first area AA1, the second gate driver 42B operates non-synchronously with the first gate driver 42A. In the second gate driver 42B, the start signal ST2 is set to the high potential (H) at time t3. At time t4, the shift clock signal SCK2 changes from the low potential (L) to the high potential (H). At time t4, that is, at the time of the rising edge of the shift clock signal SCK2, the output signal Q is output from the second register circuit SR2.

During the period when the shift clock signal SCK2 is at the high potential (H), the output control signals GCK3 and GCK4 are set to the high potential (H) in a time-division manner. In more detail, the output control signal GCK3 is set to the high potential (H) at time t4. The output control signal GCK4 is set to the high potential (H) at time t5. The gate control signals G3 and G4 are set to the high potential (H) in a time-division manner according to the output control signals GCK3 and GCK4.

Then, in the first gate driver 42A, the shift clock signal SCK1 changes from the high potential (H) to the low potential (L) at time t6. At time t6, that is, at the time of the falling edge of the shift clock signal SCK1, the output signal Q is output from the first register circuit SR1.

The output control signal GCK1 is set to the high potential (H) at time t6. The output control signal GCK2 is set to the high potential (H) at time t7. The gate control signals G5 and G6 are set to the high potential (H) in a time-division manner according to the output control signals GCK1 and GCK2.

Then, in the second gate driver 42B, the shift clock signal SCK2 changes from the high potential (H) to the low potential (L) at time t8. At time t8, that is, at the time of the falling edge of the shift clock signal SCK2, the output signal Q is output from the second register circuit SR2.

During the period when the shift clock signal SCK2 is at the low potential (L), the output control signal GCK3 is set to the high potential (H) at time t8. The output control signal GCK4 is set to the high potential (H) at time t9. The gate control signals G7 and G8 are set to the high potential (H) in a time-division manner according to the output control signals GCK3 and GCK4.

At and after time t10, by repeating the operation illustrated from time t2 to time t9, the first register circuit SR1 of the first gate driver 42A and the second register circuit SR2 of the second gate driver 42B operate so as to alternately output the output signal Q. The first output circuit OC1 and the second output circuit OC2 sequentially output the gate control signals G1, G2, G3, G4, G5, G6, G7, G8, G9, G10, G11 and G12 at the high potential (H) in a time-divisional manner.

The buffer circuit 50 generates the gate drive signals GATE based on the gate control signals G1, G2, ..., G12 generated as the logic values. The gate drive signals GATE are generated so as to have a waveform corresponding to the gate control signals G illustrated in FIG. 8. That is, the gate drive signals GATE have the first potential VGH corresponding to the gate control signals G at the high potential (H), and have the second potential VGL lower than the first potential VGH corresponding to the gate control signals G at the low potential (L). The gate drive signals GATE are sequentially supplied to the gate lines GL from the gate line GL1 to the gate line GL12. Through the operation described above, the first and the second gate drivers 42A and 42B sequentially scan the gate lines GL in the first area AA1.

In FIG. 8, the start signal ST2 supplied to the second gate driver 42B is a signal different from the start signal ST1 supplied to the first gate driver 42A, and changes from the low potential (L) to the high potential (H) at a different time from that of the start signal ST1. However, the start signal ST2 supplied to the second gate driver 42B is not limited to such a signal, and may be the same signal as the start signal ST1. When the first and the second gate drivers 42A and 42B is configured to receive the same start signal ST1, at least one wiring line can be eliminated. In also the timing diagrams illustrated in FIGS. 9 and 10 to be explained later, the start signals ST1 and ST2 may be different signals or the same signal.

Figure 9:
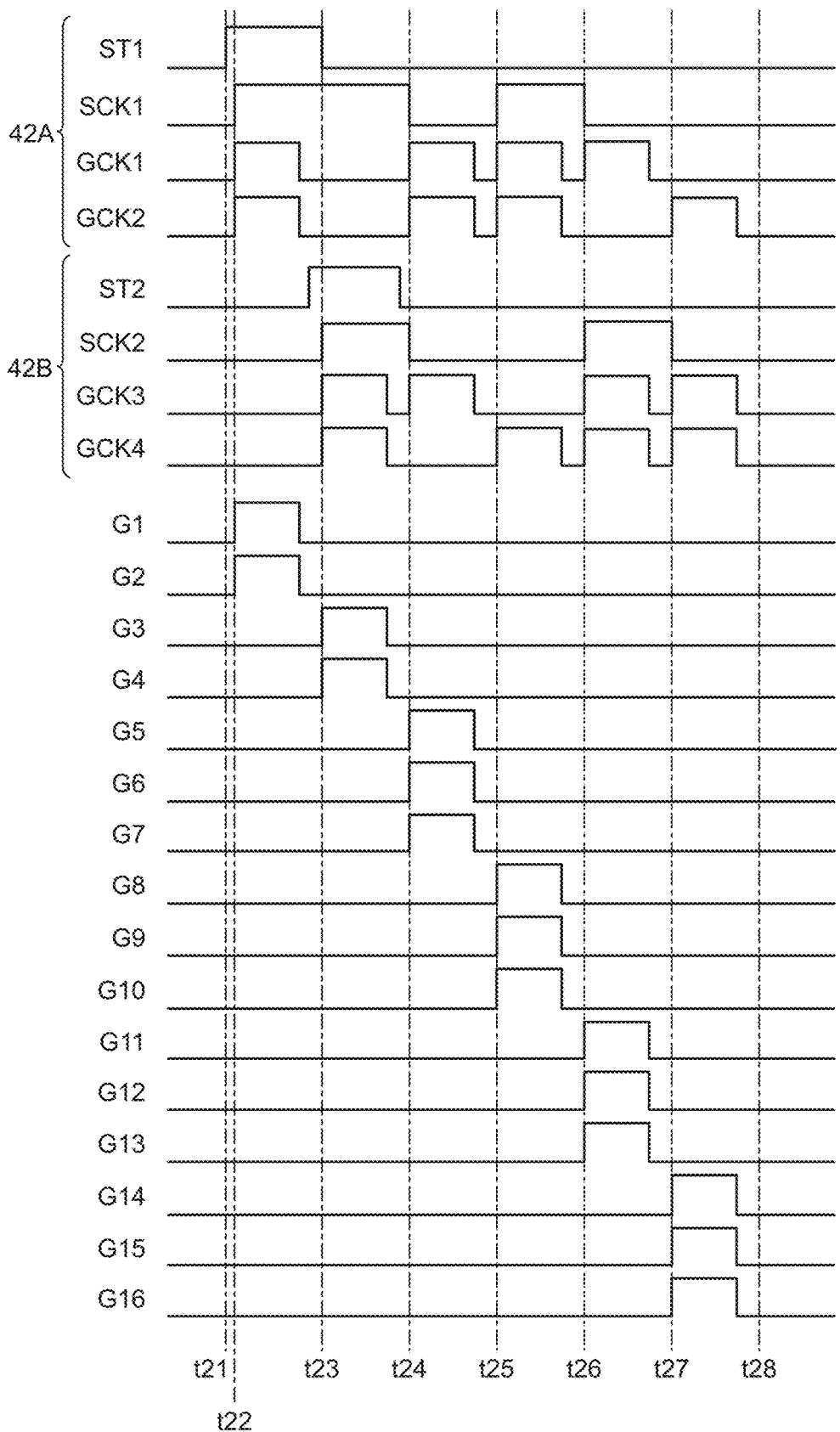
FIG. 9 is a timing diagram for explaining the method for scanning the gate lines in a second area.

FIG. 9 is a timing diagram for explaining the method for scanning the gate lines in the second area. As illustrated in FIG. 9, the first and the second gate drivers 42A and 42B simultaneously scan two of the gate lines GL during periods from time t21 to time t24 (the number of bundled gate lines GN=2), and simultaneously scan three of the gate lines GL during periods from time t24 to time t28 (the number of bundled gate lines GN=3).

In the first gate driver 42A, the start signal ST1 is set to the high potential (H) at time t21. The shift clock signal SCK1 changes from the low potential (L) to the high potential (H) at time t22. At time t22, the output signal Q is output from the first register circuit SR1.

During the period when the shift clock signal SCK1 is at the high potential (H), the output control signals GCK1 and GCK2 are set to the high potential (H) at time t22. The gate control signals G1 and G2 are set to the high potential (H) according to the output control signals GCK1 and GCK2.

Then, in the second gate driver 42B, the start signal ST2 is set to the high potential (H) at a time before time t23. The shift clock signal SCK2 changes from the low potential (L) to the high potential (H) at time t23. At time t23, the output signal Q is output from the second register circuit SR2.

During the period when the shift clock signal SCK2 is at the high potential (H), the output control signals GCK3 and GCK4 are set to the high potential (H) at time t23. The gate control signals G3 and G4 are set to the high potential (H) according to the output control signals GCK3 and GCK4.

As a result, in each of the periods from time t21 to time t24, the gate drive signals GATE are simultaneously supplied to the two gate lines GL, and the two gate lines GL are collectively scanned. In FIG. 9, the period in which the two gate lines GL are collectively scanned is repeatedly illustrated twice, but the period may be repeated three or more times.

Then, at time t24, the shift clock signals SCK1 and SCK2 change from the high potential (H) to the low potential (L). At time t24, the output signal Q is output from each of the first register circuit SR1-2 and the second register circuit SR2-2.

During a period when the shift clock signals SCK1 and SCK2 are at the low potential (L), the output control signals GCK1, GCK2, and GCK3 are set to the high potential (H) at time t24. The output control signal GCK4 maintains the low potential (L). The gate control signals G5, G6, and G7 are set to the high potential (H) according to the output control signals GCK1, GCK2, and GCK3.

Then, at time t25, the shift clock signal SCK1 changes from the low potential (L) to the high potential (H). The shift clock signal SCK2 maintains the low potential (L). At time t25, the output signal Q is output from the first register circuit SR1-3.

During a period when the shift clock signal SCK1 is at the high potential (H) and the shift clock signal SCK2 is at the low potential (L), the output control signals GCK1, GCK2, and GCK4 are set to the high potential (H) at time t25. The gate control signals G8, G9, and G10 are set to the high potential (H) according to the output control signals GCK1, GCK2, and GCK4.

In the same way, also at and after time t26, the first register circuit SR1 of the first gate driver 42A and the second register circuit SR2 of the second gate driver 42B sequentially output the output signals Q, either synchronously or non-synchronously, thus operating to set three of the gate control signals G to the high potential (H).

That is, during the same period, one of the first and the second gate drivers 42A and 42B sets the gate control signal G corresponding to P (P=2) of the gate lines GL to the high potential (H), and the other of the first and the second gate drivers 42A and 42B sets the gate control signal G corresponding to one of the gate lines GL to the high potential (H).

As a result, in each of the periods from time t24 to time t28, the gate drive signals GATE are simultaneously supplied to the three gate lines GL, and the three gate lines GL are collectively scanned. That is, in the first gate driver 42A, P (P=2, for example) of the gate lines GL are coupled to one set of the first register circuit SR1 and the first output circuit OC1. In the second gate driver 42B, P (P=2, for example) of the gate lines GL are coupled to one set of the second register circuit SR2 and the second output circuit OC2. In the present embodiment, the first and the second gate drivers 42A and 42B simultaneously scan (P+1) of the gate lines GL adjacent to one another in the second direction Dy in the second area AA2. In other words, the first and the second gate drivers 42A and 42B simultaneously scan P of the gate lines GL that are coupled to one of the first and the second gate drivers 42A and 42B, and one of the gate lines GL that is coupled to the other of the first and the second gate drivers 42A and 42B and is adjacent to the P of the gate lines GL. The number of the gate lines GL simultaneously scanned by the first and the second gate drivers 42A and 42B in the second area AA2 is at most (P+1) gate lines adjacent to one another in the second direction Dy, and the first and the second gate drivers 42A and 42B may simultaneously scan (P+1) gate lines GL or less.

In FIG. 9, the period when three of the gate lines GL are collectively scanned is repeated four times from time t24 to time t28, but such a period may be repeated three times or less, or five times or more.

As described above, in the present embodiment, the gate lines GL are coupled alternately to the first and the second gate drivers 42A and 42B in units of P (P=2, for example) adjacent gate lines GL. The first and the second gate drivers 42A and 42B receive the different shift clock signals SCK and the different output control signals GCK, and are controlled independently of each other. The first and the second gate drivers 42A and 42B operate synchronously or non-synchronously during one frame period.

As a result, the first and the second gate drivers 42A and 42B sequentially scan the gate lines GL in the first area AA1 and simultaneously scan the gate lines GL adjacent to one another in the second direction Dy in the second area AA2. In other words, the first and the second gate drivers 42A and 42B have a period of sequentially scanning the gate lines GL (for example, from time t1 to time t14) and a period of simultaneously scanning the gate lines GL adjacent to one another in the second direction Dy (for example, from time t21 to time t28), in one frame period.

This configuration allows the display device 1 of the present embodiment to improve the flexibility of scanning operation of the gate lines GL in one frame period as compared with a case where the gate lines GL are scanned by one gate driver 42. More specifically, the period required for the scanning in the second area AA2 is reduced to ½ or ⅓ that of, for example, a case where the gate drive signal GATE is sequentially supplied to the gate line GL in each of the pixel rows in the entire display area AA, and thus, the display device 1 can shorten the drive period in one frame. The display device 1 also maintains the high-definition display in the first area AA1 as compared with a case where more than one of the gate lines GL are simultaneously scanned in the entire display area AA. As a result, the display device 1 can reduce the decrease in the frame rate while increasing the definition of the display.

The timing diagrams illustrated in FIGS. 8 and 9 are merely exemplary and can be changed as appropriate as long as the configuration is such that (P+1) of the gate lines GL are simultaneously scanned. For example, FIG. 9 illustrates the example in which the first and the second gate drivers 42A and 42B change the number of bundled gate lines GN (the number of the gate lines GL that are simultaneously supplied with the gate drive signals GATE) from GN=2 to GN=3 in the second area AA2, but the present disclosure is not limited to this example. The first and the second gate drivers 42A and 42B may simultaneously scan the gate lines GL over the second area AA2 with the number of bundled gate lines GN set to 2, or may scan the gate lines GL over the second area AA2 with the number of bundled gate lines GN set to 3. While FIG. 9 illustrates the method for scanning the gate lines GL in the second area AA2, the method for scanning illustrated in FIG. 9 is also applicable to the gate lines GL in the third area AA3 (refer to FIG. 5).

Modification

Figure 10:
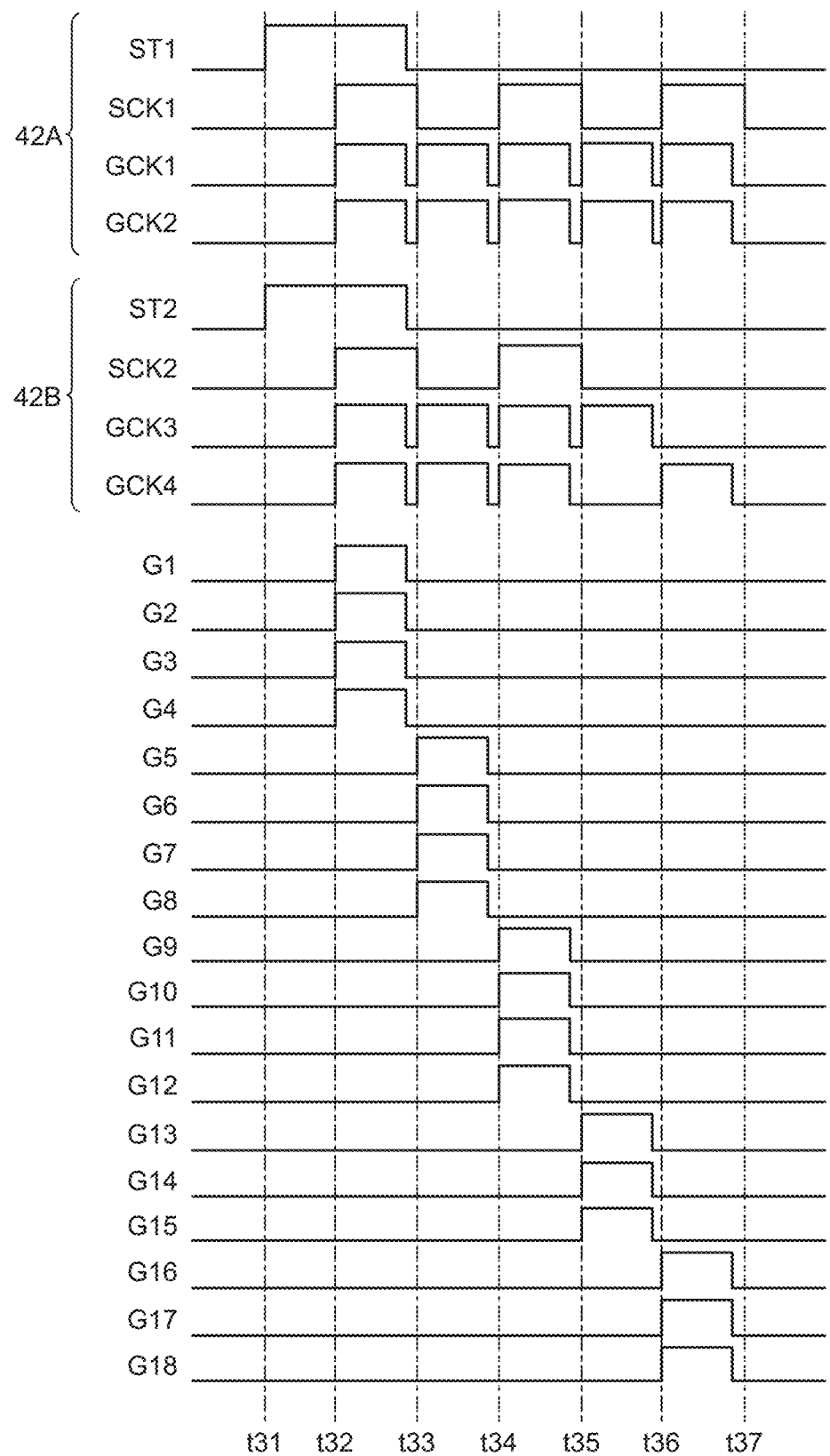
FIG. 10 is a timing diagram for explaining the method for scanning the gate lines in the second area of the display device according to a modification of the embodiment.

FIG. 10 is a timing diagram for explaining the method for scanning the gate lines in the second area of the display device according to a modification of the embodiment. As illustrated in FIG. 10, in the modification, the first and the second gate drivers 42A and 42B simultaneously scan (P×2) of the gate lines GL in the second area AA2 (P=2 in the present modification). That is, the first and the second gate drivers 42A and 42B synchronously operate and simultaneously scan P of the gate lines GL coupled to the first gate driver 42A and P of the gate lines GL coupled to the second gate driver 42B.

More specifically, in the first and the second gate drivers 42A and 42B, the start signal ST1 and the start signal ST2 are set to the high potential (H) at time t31. At time t32, the shift clock signals SCK1 and SCK2 change from the low potential (L) to the high potential (H). At the time of the rising edges of the shift clock signals SCK1 and SCK2, the output signals Q are output from the first and the second register circuits SR1 and SR2, respectively.

During the period when the shift clock signals SCK1 and SCK2 are at the high potential (H), the output control signals GCK1, GCK2, GCK3, and GCK4 are set to the high potential (H). The gate control signals G1, G2, G3, and G4 are set to the high potential (H) according to the output control signals GCK1, GCK2, GCK3, and GCK4.

At time t33, the shift clock signals SCK1 and SCK2 changes from the high potential (H) to the low potential (L). At the time of the falling edges of the shift clock signals SCK1 and SCK2, the output signals Q are output from the first and the second register circuits SR1 and SR2.

During the period when the shift clock signals SCK1 and SCK2 are at the low potential (L), the output control signals GCK1, GCK2, GCK3 and GCK4 are set to the high potential (H). The gate control signals G5, G6, G7, and G8 are set to the high potential (H) according to the output control signals GCK1, GCK2, GCK3, and GCK4.

At time t34, the first and the second gate drivers 42A and 42B perform the same operation as in the period from time t32 to time t33 described above, and the gate control signals G9, G10, G11, and G12 are set to the high potential (H).

As described above, the first and the second gate drivers 42A and 42B simultaneously supply the gate drive signals GATE to four of the gate lines GL. In the present modification, the four gate lines GL to which the gate drive signals GATE are simultaneously supplied are a combination of P (P=2) of the gate lines GL coupled to one set of the first register circuit SR1 and the first output circuit OC1 and P (P=2) of the gate lines GL coupled to one set of the second register circuit SR2 and the second output circuit OC2.

At and after time t35, the first and the second gate drivers 42A and 42B simultaneously scan three of the gate lines GL in the same way as in the method for scanning described with reference to FIG. 9. That is, the present modification can be combined with the embodiment described above. For example, the present disclosure is not limited to the example illustrated in FIG. 10, and two of gate lines GL may be simultaneously scanned after a period of simultaneous scanning of four of the gate lines GL. Alternatively, one frame period may include a period of simultaneously scanning four of the gate lines GL, a period of simultaneously scanning three of the gate lines GL, and a period of simultaneously scanning two of the gate lines GL; and the number of the simultaneously scanned gate lines GL may be sequentially changed.

In the embodiment and the modification thereof described above, the example has been described in which the gate lines GL are coupled alternately to the first and the second gate drivers 42A and 42B in units of P (P=2) gate lines GL arranged in the second direction Dy, but the present disclosure is not limited to this example. For example, a case where P=4 may be considered, that is, four (P=4) of the gate lines GL may be coupled to one set of the first register circuit SR1 and the first output circuit OC1 in the first gate driver 42A and four (P=4) of the gate lines GL may be coupled to one set of the second register circuit SR2 and the second output circuit OC2 in the second gate driver 42B.

In this case, the first and the second gate drivers 42A and 42B may simultaneously scan three of the four gate lines GL coupled to the first gate driver 42A and two of the four gate lines GL coupled to the second gate driver 42B that are adjacent to the three gate lines GL mentioned above (that is, P+1=five gate lines).

In other words, in the second area AA2, the first and the second gate drivers 42A and 42B simultaneously scan m (m is a natural number and m<P+1) of the gate lines GL that are coupled to one of the first and the second gate drivers 42A and 42B, and (P+1−m) of the gate lines GL that are coupled to the other of the first and the second gate drivers 42A and 42B and are adjacent to the m gate lines GL. This method allows the display device 1 to improve the flexibility of setting the simultaneously scanned gate lines GL.

While the preferred embodiment of the present disclosure has been described above, the present disclosure is not limited to such an embodiment. The content disclosed in the embodiment is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiment and the modification thereof described above.

What is claimed is:

1. A display device comprising:
   a substrate that has a display area;
   a plurality of pixels that are provided in the display area and are arranged in a first direction and a second direction intersecting the first direction;
   a plurality of gate lines that extend in the first direction and are arranged in the second direction; and
   a first gate driver and a second gate driver that are configured to supply gate drive signals to the gate lines, wherein
   the first gate driver and the second gate driver are each provided along the second direction and are arranged in the first direction, and
   the first gate driver and the second gate driver are configured to:
      sequentially scan the gate lines in a first area of the display area; and
      simultaneously scan more than one of the gate lines that are adjacent to one another in the second direction in a second area different from the first area of the display area.

2. The display device according to claim 1, wherein the gate lines are coupled alternately to the first gate driver and the second gate driver in units of P gate lines adjacent to one another in the second direction, wherein P is a natural number.

3. The display device according to claim 2, wherein the first gate driver and the second gate driver are configured to simultaneously scan at most (P+1) of the gate lines adjacent to one another in the second direction in the second area.

4. The display device according to claim 3, wherein the first gate driver and the second gate driver are configured to simultaneously scan P of the gate lines that are coupled to one of the first gate driver and the second gate driver and one of the gate lines that is coupled to the other of the first gate driver and the second gate driver and is adjacent to the P gate lines, in the second area.

5. The display device according to claim 2, wherein the first gate driver and the second gate driver are configured to simultaneously scan m of the gate lines that are coupled to one of the first gate driver and the second gate driver and (P+1−m) of the gate lines that are coupled to another of the first gate driver and the second gate driver and are adjacent to the m gate lines, in the second area, wherein m is a natural number and m<P+1.

6. The display device according to claim 2, wherein the first gate driver and the second gate driver are configured to simultaneously scan P of the gate lines coupled to the first gate driver and P of the gate lines coupled to the second gate driver, in the second area.

7. The display device according to claim 1, wherein
the first gate driver comprises a plurality of first register circuits arranged in the second direction and a plurality of first output circuits provided correspondingly to the first register circuits, and
the second gate driver comprises a plurality of second register circuits arranged in the second direction and a plurality of second output circuits provided correspondingly to the respective second register circuits.

8. The display device according to claim 7, wherein
each of the first register circuits comprises a clocked inverter and an inverter and is configured to output an output signal in accordance with an input signal having a high potential at a time based on a shift clock signal, and
each of the first output circuits comprises P AND circuits that are configured to:
generate, as logic values of the gate drive signals, logical product values between the output signal of the first register circuit and P independent output control signals; and
drive P of the gate lines,
wherein P is a natural number.

9. The display device according to claim 8, wherein
the second register circuits and the second output circuits of the second gate driver
have the same configuration as the first register circuits and the first output circuits of the first gate driver, and
are configured to generate logic values of the gate drive signals based on a shift clock signal and an output control signal different from those of the first gate driver.

* * * * *